March 18, 1947.   W. M. SCARBOROUGH   2,417,706
ADJUSTABLE FAIRLEAD
Filed Dec. 23, 1943

Wm. M. Scarborough INVENTOR.
BY
His Patent Attorney

Patented Mar. 18, 1947

2,417,706

UNITED STATES PATENT OFFICE 2,417,706

ADJUSTABLE FAIRLEAD

William M. Scarborough, Overland, Mo., assignor to Curtiss-Wright Corporation, a corporation of Delaware Application December 23, 1943, Serial No. 515,341

10 Claims. (Cl. 254—190)

The present invention relates to means for guiding flexible elements and more particularly for improvements in adjustable fairleads for cables, ropes and similar force transmitting devices.

In cable or rope systems, particularly those in which the cable run is of any length, or passes through partitions or bulkheads, or where the cable is subject to vibrations, suitable guide means known as fairleads or fairleaders are provided for positioning and permitting free movement of the cable in the desired direction. These fairleads are usually required to be of such design that the cable may pass freely therethrough, or across a suitable support, with a minimum of chafing or wear, thus precluding possible injury to either the cable or the support, or both. In a number of prior installations fairleads have been non-adjustable in the sense that the device when installed was incapable of movement in the radial direction from a given rope or cable centerline location. More recently, particularly in aircraft cable installations, fairleads of an angularly adjustable type have been used but these frequently lack provision for desirable lateral adjustability with respect to the cable axis.

Due to the exigencies of high production manufacture, and for a number of other reasons, the cables when installed in an airplane frequently do not conform precisely to the predetermined centerline locations intended for them, and it has accordingly become essential that the fairleads be made in such a manner that they will permit of lateral adjustment with respect to the cable axes. In installations where fixed fairleads have been used on a long cable run or span requiring a multiplicity of fairleads, the cable contacting the several fairleads adds considerable frictional load to the particular control system, usually in direct proportion to the number of fixed fairleads in contact with the cable along its run. By the use of laterally adjustable fairleads, adjusted to their positions in which they enclose but are out of contact with the cable, these unnecessary loads are substantially eliminated.

The primary purpose of an adjustable fairlead is principally to eliminate possibilities of added friction in the control system, whether in that of an airplane or in any system where cables are employed to transmit forces in tension from a controlling, or a controlled device or mechanism. Slight misalinement of control cables may be permissible, as adjustable fairleads can later be arranged in a centered relation with respect to the misalined cable. The improved type of adjustable fairlead comprising the present invention allows for these adjustments without detracting from such advantageous features as its ease of installation, ready serviceability, interchangeability, standardization of parts and consequent high production at relatively low cost. A further important point in maintaining safety of flight at higher speeds is the desirability of adding additional fairleads in the control system in order to raise the frequency of vibration of the cables well above that of the airplane structure in order to prevent flutter. A convenient manner of attaining this is to support long spans of cable and heavy fittings by increasing the number of fairleads and locating them as closely together as practicable. The use of an adjustable fairlead of the present type has been found particularly advantageous in facilitating the installation of the required additional fairleads without hindering production or interfering in any manner with the operation of the cable control system.

It is accordingly a major object of the present invention to provide a fairlead having characteristics of extreme simplicity and capable of ready adjustability and interchangeability. Another primary object is the provision of a fairlead of this type comprised of two principal platelike parts, each of which is identical with the other as to its general form and arrangement of the cable guide and mounting features; and of such construction that by reversely relating one part with respect to the other, cable guide apertures are formed and the mounting thereof is rendered adjustable with relation to the cables and also to the anchoring or mounting units of the fairlead.

A further object is the provision of a block or plate type fairlead having one or more cable guide slots, as well as a pair of spaced mounting bolt slots, the longitudinal axes of which are normal to the longitudinal axes of the guide slot or slots; such that when two of these blocks are properly assembled in juxtaposed relationship the guide slot of one will be normal to and serve to confine the slot in the other, and the same conditions will exist as to the mounting bolt slots of each block. A still further object resides in the provision of a simple system of interchangeable fairlead blocks such that the cable guide slot principle may be easily adapted for a multiplicity of cables arranged in one bank. Another object of the present invention is the provision of a fairlead of the type described which may be installed or removed without the necessity of disturbing the cable system. A still further object of the invention resides in a fairlead which shall be practically self-alining at the time the cables are rigged and one in which cable friction, chafing and wear will be reduced to a minimum.

Other objects and advantages of the present invention will either be pointed out during the course of the following description, or will become apparent to those skilled in the art after a reading of the present description taken with reference to the accompanying drawings, in which like reference numerals refer to like parts and features in the several views, as follows.

Figure 1:
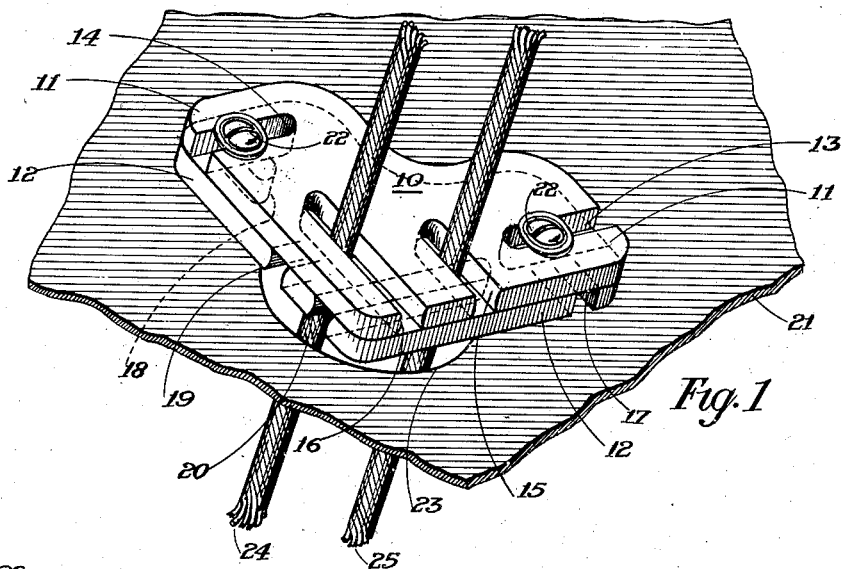
Fig. 1 is a perspective view of a fairlead installation as adapted for a pair of cables and in which my improved system of cable guide and mounting slots is indicated.
Figure 2:
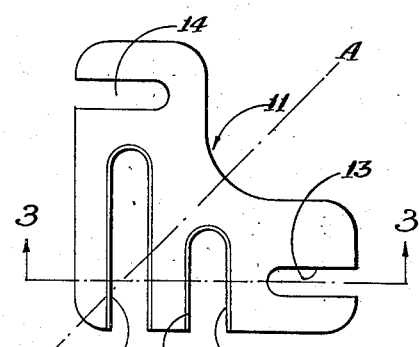
Fig. 2 is a plan view of either of the fairlead blocks illustrated in Fig. 1.
Figure 3:
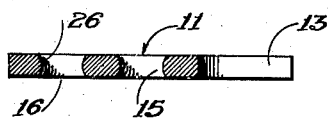
Fig. 3 is a cross sectional view of the block shown in Fig. 2 as taken along the lines 3—3.

Referring now to the perspective view in Fig. 1 and the plan and cross sectional views of Figs. 2 and 3, the fairlead assembly 10 comprises a pair of superimposed individual plate-like blocks or units 11 and 12, each being identical as to plan, form and structure. For convenience the unit shown in Figs. 2 and 3 may be referred to as the upper of the two units shown in Fig. 1, it being clearly seen that the lower unit 12 is identical with its upper mating unit with the exception that it has been turned end over end, such that it occupies the reversed position of the lower unit in Fig. 1. It will be noted that in this relative positioning of the blocks in Fig. 1 their outlines or peripheries are in juxtaposition or coincident with each other but that the cable guide and mounting slots of one block are normal or perpendicular to those of the other. The block 11 is provided with spaced parallel mounting slots or openings 13 and 14 as well as spaced parallel cable guide slots 15 and 16. The anchor slots 13 and 14, however, open outwardly through opposite sides of the block 11, whereas the cable guide slots 15 and 16 open toward the same side, or at the same edge of the block. It is also important to note that the slots 15 and 16 extend in a direction normal or perpendicular with respect to the direction of the slots 13 and 14.

The lower block 12 as previously set forth, is identical with the upper block 11 except that it is reversely positioned back-to-back thereunder in a co-planar attitude such that its mounting slots 17 and 18 extend perpendicularly to the slots 13 and 14 respectively of the upper block. It will also be noted that the guide slots 19 and 20 of the lower block 12 are also positioned such that they extend perpendicularly to the guide slots 15 and 16 respectively of the upper block 11. For purposes of explanation there has been indicated in Fig. 2 a diagonal axis A—A about which the unit shown in Fig. 2 can be rotated through 180° such that it would occupy the reverse position of the lower block 12 as indicated in Fig. 1. It will be noted that the axis A—A is substantially within the plane of symmetry of the outline of the block, and with regard to its cable guide and mounting slots. The turning over, or rotation of the block 11 through 180° such that it will again lie in the same plane as the initial plane results in a reversal of the mounting slots 13 and 14 extending oppositely and horizontally as viewed in Fig. 2 to a resulting position in which they extend upwardly and downwardly in a vertical direction respectively.

Such rotation of the unit through 180° also has the effect of changing the direction of the cable guide slots 15 and 16 from their downwardly extending direction in which they open at the lower edge of the block 11 in Fig. 2 to a position in which they extend horizontally to the left, opening along the left edge of the turned-over block, in which it would occupy a position coincident with the block 12 in Fig. 1. When the fairlead blocks 11 and 12 have been adjusted into their relative positions of Fig. 1 in which they are out of contact with the cables and their peripheries substantially coincide but in which their slots cross each other, they are then in position to be secured in this superposed relationship upon a bulkhead, wall or other support portion 21 of the airplane or other structure by means of the screws 22 threadedly engaging suitable nuts which may be fixed at their lower ends (not shown). The cables supported by the fairlead assembly are indicated at 24 and 25 passing through the opening 23 of the bulkhead or other portion 21, the opening 23 being of such size that the cables 24 and 25 are permitted some deviation or misalinement from their designed or centrally located or intended position.

It should also be noted that the assembled relationship of the fairlead units in Fig. 1 are shown in the optimum or designed position substantially juxtaposed or coincident with each other and which relationship would only be attained when the cables as installed at the precise positions for which the fairlead assembly and its mounting bolts may have been designed. Obviously, were either or both of the cables 24 or 25 installed such that they occupied positions nearer the lower right hand corner of Fig. 1, the lower block 12 only would be moved in the same direction and to the same extent to continue to accommodate the cable within its guide slots 19 and 20. The cable slots are preferably made open-ended to facilitate installation but the mounting slots can obviously be made with closed ends. It is further pointed out that the shape or form of the unit shown in Fig. 2 results from a fairlead assembly comprising two mounting screws and intended to accommodate two control cables, in which the mounting screw and cable positions bear a given general relationship. The unit shown in Fig. 2 is accordingly illustrated in a substantially L shape or angular form adapted to accommodate the general relationship referred to and designed to contain a minimum amount of material to provide a suitable strength-to-weight ratio for the given general relationship. It will therefore be obvious that the present invention is by no means limited to fairlead units of the shape shown in the figures of the drawings but that they may be either circular, square or rectangular, or of other form, or with open or closed slots, in each of which they would also attain the advantages and utilize the teachings of my invention.

Figure 4:
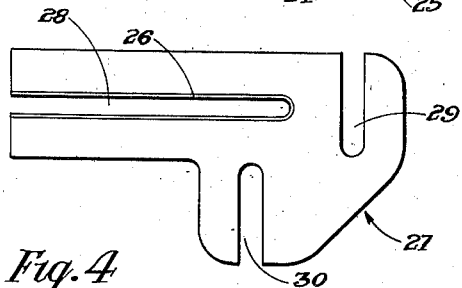
Figs. 4 and 5 illustrate in plan view the cooperating blocks of a unitary fairlead structure which has been modified to accommodate a plurality of cables.
Figure 5:
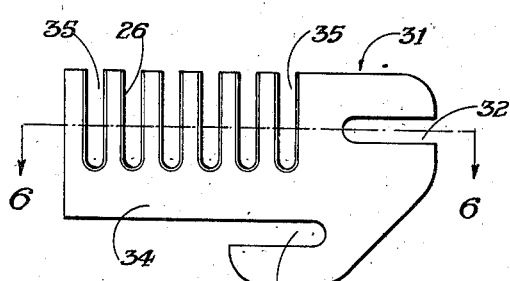

Prior to the tightening of the mounting screws 22 the assembly of the fairlead blocks 11 and 12 is accomplished by first slipping the block 12 over the cables from the upper right as viewed in Fig. 1 toward the lower left such that cable 24 enters slot 19 and cable 25 enters slot 20. The relative length of these slots 19 and 20 is determined by the size of the aperture or opening which is provided at 23. Block 11 is then set over the cables 24 and 25 from the upper left towards the lower right as viewed in Fig. 1 such that the slots 15 and 16 embrace and confine the cables within the space defined by the walls of the slots in cooperation with the walls of slots 19 and 20. The cable guide slots are each preferably convexly rounded slightly along their walls as indicated at 26 in Figs. 2 and 3 in order to permit freer passage of the cable therethrough and to minimize chafing, friction and wear. The screws 22 are then inserted into the slots 14 and 18, and 13 and 17 respectively for engagement with the nut (not shown) which may be fixed upon the opposite or lower side of the wall 21. A serrated or star-type washer (also not shown) is preferably positioned upon each of the screws 22 to lie between the blocks 11 and 12, the purpose of these washers being to provide sufficient surface friction to lock or hold the blocks from any displacement from the intended position due to vibration, or from other causes. Prior to the tightening of the screws 22, the blocks are moved about at right angles to each other until the rounded walls 26 of the respective cooperating guide slots assume positions around but free of contact with the cables. It will be observed that motion of block 11 is always at right angles to the motion of the block 12 and this being true because of the motion limitation imposed on each by the slots 13 and 14 and slots 17 and 18, respectively. Thus, the location of the cable apertures may be varied at will over the area of the aperture 23 merely by the linear movement of either one or both of the fairlead blocks 11 and 12.

Where it is necessary or desirable to have a plurality of cables in close adjacence, there is provided a single fairlead unit comprising cooperating blocks formed in a manner to accommodate as many as six cables in one bank. The details of this fairlead unit are clearly shown in Figs. 4 and 5. In Fig. 4, the fairlead block 27 is formed with a single long guide slot 28 and the usual pair of opposed but parallel mounting slots 29 and 30. It is to be noted that in this modified form there can be no reversing of the block 27 as is the case with the block 11 of Fig. 2, the latter block being symmetrical about axis A—A and hence reversible without disturbing the matching peripheral contour of two such blocks when placed one on another.

Figure 6:
Fig. 6 is a cross sectional view of the multiple unit shown in Fig. 5 taken along the lines 6—6.

The counterpart of the fairlead block 27 comprises a block 31 (Figs. 5 and 6) which has the same plan-view aspect as the block 27. However in this case the block 31 has its elongated portion 34 formed with a plurality of cable guiding slots 35, six being shown. It has been found that the extent of elongation of the portion 34 is preferably limited to accommodate approximately six guide slots, although it may be entirely feasible to provide more than six guide slots. The blocks 31 may be constructed as shown and if less than six cables are present in the cable bank the unnecessary material of the portion 34 can be cut off. Here again the block 31 is not reversible to permit it to be turned end over end for use in conjunction with an identical block. It is obvious from the foregoing that fairlead blocks 27 and 31 must be used in conjunction for the guiding of a bank or plurality of cables. Block 31 is provided with mounting slots 32 and 33 which are positioned normal to the corresponding slots 29 and 30 in block 27. Friction means, as the serrated washers referred to above, is utilized to secure the adjacent blocks 27 and 31 from unintended relative movement or shifting. Thus the cables may be confined in the mating guide slots 28 and 35 without contacting the rounded faces 26 of these slots.

While the foregoing description has dealt with preferred modifications of my adjustable fairlead in which the principle of 90° angularity of the related cable and mounting slots has been shown and preferred, it will be understood by those skilled in the art that other modifications depending upon other degrees of angularity may be utilized in certain installations with equally satisfactory results and that these modifications are intended to come within the scope of the present invention. Most installations will require merely an intersection of the slots and even relatively small angles have been found suitable. The fairlead blocks may be formed of molded or sheet phenolic material which is easily worked in either form, but other materials have been found equally desirable and suitable from which the blocks may also be formed.

It will accordingly be seen from the above description and the accompanying drawings that my adjustable fairlead is an improvement over those heretofore available in many respects. Among these might be stated its simplication and improvement in function, its ease of installation and servicing, and its interchangeability and adaptability to standardization and high rate of production. Among its functions it eliminates the possibility of added friction to the control system due to any misalinement or the necessity of addition of fairleads, without compromising on other desirable and necessary features of which but a few are referred to herein. From the standpoint of its ease of installation it will be noted that no drilling of the parts is necessary at the time of its assembly and neither are jigs or templates required to locate these fairleads. The fairleads may be readily installed or removed without removing the cable or cables, which in turn may be either installed or removed without the necessity of removing the fairleads. A cable will also tend to aline the fairlead during the rigging operation and before the screws holding the fairlead in position are tightened. From the standpoint of servicing it is readily seen that it is not necessary to detach any part of the fairlead when removing or replacing the cables, thus eliminating the possibility of losing parts in the field where such parts may not be readily obtainable.

It will also be noted by those skilled in the art that my improved fairlead lends itself to being readily interchangeable in that two identical parts may be used for each fairlead assembly by merely positioning one of the two units in a reversed relationship to the other. This eliminates right and left hand parts and the dimensions of both the fairlead slots and portions as well as the location of the mounting holes are not critical but permit of relatively wide variation. Due to the fact that the elements of the present fairlead are so readily interchangeable, self-alining and easy to install, it has been found possible as a typical example to make a standardization of some six different parts which take care of approximately ninety percent of all the cases where fairleads had been required. The fairlead parts may be produced at a relatively high rate of production through either molding, stamping or stack machining methods at relatively low cost due to the simplicity of its design and the lesser number of required sizes.

Other modifications and advantages of the present invention both with respect to general arrangement and detailed features which may become apparent to those skilled in the art after a reading of the foregoing specification are each intended to be embraced within the scope and spirit of this invention as more particularly defined in the appended claims.

I claim:

1. A fairlead for a cable comprising a pair of identical apertured flat sheet members, said members being disposed in a back-to-back relationship with the apertures in one extending intersectingly across the openings in the other to form therewith complementary openings for the accommodation of a plurality of attachment means and a cable, said apertures being elongated such that said members can be relatively adjusted to accommodate varying relationships of the axes of said attachment means and said cable.

2. In an aircraft cable system, a cable, a support having attachment openings within said support, and a pair of identical slotted plate elements related in a reversely superimposed disposition and arranged against said support with the slots in one element extending to intersectingly cross corresponding slots of the other to provide confined complementary openings for the attachment of said elements to the openings in said support and further complementary openings adapted to guide said cable in its movement past said support.

3. An adjustable fairlead for a cable comprising a first slotted flat plate member, a second slotted plate member identical in form with said first member having in a reversed disposition its slots extending in a direction intersecting those of said first member, corresponding slots in each of said members cooperating to form a guide for a cable, corresponding slots in each of said members adapted by their intersection to provide an attachment aperture and means passing through said aperture for the attachment of said members in a superimposed relationship, the said slots being angularly disposed in each member whereby relative shifting along their plane of contact is adapted to accommodate a plurality of varied relationships of said cable and attachment means.

4. In an adjustable fairlead for a cable, a pair of identical elements cut from a flat sheet such that each is provided with an attachment slot, and a guide slot in each element extending in a direction other than the direction of said attachment slot, each said element adapted to form with its mating identical element in a reversed but superimposed disposition an adjustable fairlead having intersecting attachment slots and intersecting slots for the guidance of a cable.

5. An adjustable fairlead for a cable passing a support comprising a first slotted flat plate member, a second slotted flat plate member identical with said first member superimposed upon said first member and having its slots extending in a direction intersecting those of said first member, at least one slot in each of said members cooperating to form a guide for a cable, certain other slots in each of said members adapted by their intersection to mutually provide attachment apertures and means passing through said apertures for the adjustable attachment of said members to a support.

6. In an adjustable fairlead, an element cut from a flat sheet such that it is provided with a pair of oppositely extending but laterally spaced open attachment slots, and a guide slot in said element extending in a direction normal to the direction of said attachment slots, said element adapted to form with an identical element in a reversed disposition an adjustable fairlead having crossing attachment slots and crossing slots for the guidance of a cable, the said direction, extension, crossing and lateral spacing of said slots being defined within the plane of contact of said flat elements.

7. In an adjustable fairlead, an element cut from a flat sheet such that it is provided with a pair of oppositely extending but laterally spaced open attachment slots, and a guide slot in said member extending in a direction other than the direction of said attachment slots, said element adapted to form, with an identical member in a reversed but superimposed disposition, an adjustable fairlead having intersecting attachment slots and intersecting slots for the guidance of a cable, the said direction, extension, intersection and lateral spacing of said slots being defined within the plane of contact of said flat elements.

8. An adjustable fairlead for cables comprising a slotted flat plate element having a pair of oppositely extending but laterally spaced parallel attachment slots opening upon edges of said element and cable guide slots extending normal to said attachment slots and open to an edge of said element, and a second slotted plate element disposed, with respect to said first plate element, in a position such that certain of its slots intersect certain attachment slots of said first element whereby said intersecting slots form adjustably aligned apertures for the accommodation of attachment devices and another of said slots intersects said cable guide slots to form adjustably aligned apertures for guiding the cables, the said direction, extension, intersection and lateral spacing of said slots being defined within the plane of contact of said flat elements.

9. An adjustable fairlead for cables comprising a flat plate element having a pair of oppositely extending but laterally spaced parallel attachment slots opening on edges of said element and cable guide slots extending normal to said attachment slots and open to an edge of said element, a second slotted plate element disposed in a superimposed position with respect to said first element such that certain of its slots intersect the attachment slots of said first element whereby said intersecting slots form adjustably aligned apertures for the accommodation of attachment devices and another of said slots intersects said cable guide slots to form adjustably aligned slots for guiding said cables, and friction means disposed between said superimposed plate elements adapted to maintain the said adjusted alignment of said slots, the said direction, extension, intersection and lateral spacing of said slots being defined within the plane of contact of said flat elements.

10. In an adjustable fairlead, an element cut from a flat sheet such that it is provided with a pair of oppositely extending but laterally spaced attachment slots, and a guide slot in said member extending angularly with respect to the direction of said attachment slots, said element adapted to form with an identical element in a reversed disposition an adjustable fairlead having intersecting attachment slots and intersecting slots for the guidance of a cable, the side walls of said guide slot being convexly rounded to eliminate chafing of said cable, the said direction, extension, intersection and lateral spacing of said slots being defined within the plane of contact of said flat elements.

WILLIAM M. SCARBOROUGH.

REFERENCES CITED

The following references are of record in the file of this patent:

UNITED STATES PATENTS

| Number | Name | Date |
| --- | --- | --- |
| 1,230,742 | McMurtrie | June 19, 1917 |
| 1,882,486 | Cole | Oct. 11, 1932 |
| 2,092,343 | Wayman | Sept. 7, 1937 |
| 1,316,255 | Ranch | Sept. 16, 1919 |
| 1,588,447 | Colbert | June 15, 1926 |
| 2,231,462 | Cobb | Feb. 11, 1941 |